United States Patent
Honma et al.

(10) Patent No.: US 7,267,702 B2
(45) Date of Patent: Sep. 11, 2007

(54) POLISHING COMPOSITION

(75) Inventors: Yuichi Honma, Wakayama (JP); Kouji Taira, Wakayama (JP); Shigeaki Takashina, Wakayama (JP)

(73) Assignee: Kao Corporation, Tokyo (JP)

( * ) Notice: Subject to any disclaimer, the term of this patent is extended or adjusted under 35 U.S.C. 154(b) by 263 days.

(21) Appl. No.: 11/095,564

(22) Filed: Apr. 1, 2005

(65) Prior Publication Data

US 2005/0221726 A1 Oct. 6, 2005

(30) Foreign Application Priority Data

Apr. 6, 2004 (JP) ............................. 2004-112410
Sep. 7, 2004 (JP) ............................. 2004-259986

(51) Int. Cl.
*B24B 1/00* (2006.01)
*B24B 37/00* (2006.01)
*C09G 1/02* (2006.01)
*C09G 1/04* (2006.01)
*C09K 3/14* (2006.01)

(52) U.S. Cl. ........................... 51/307; 51/308; 51/309; 106/3; 438/692; 438/693

(58) Field of Classification Search .......... 51/307–309; 106/3; 438/690–693
See application file for complete search history.

(56) References Cited

U.S. PATENT DOCUMENTS

| | | | |
|---|---|---|---|
| 6,123,603 A | 9/2000 | Tada et al. | |
| 6,149,696 A | 11/2000 | Jia | |
| 6,319,096 B1 * | 11/2001 | Mueller et al. | 451/41 |
| 6,478,835 B2 | 11/2002 | Miyata et al. | |
| 6,491,837 B1 | 12/2002 | Liu et al. | |
| 6,620,216 B2 | 9/2003 | Oshima et al. | |
| 6,818,031 B2 | 11/2004 | Oshima | |
| 2003/0110710 A1 | 6/2003 | Oshima et al. | |
| 2003/0124852 A1 * | 7/2003 | Fang et al. | 438/689 |
| 2005/0028449 A1 | 2/2005 | Miyata et al. | |

FOREIGN PATENT DOCUMENTS

| | | |
|---|---|---|
| EP | 0 626 236 A1 | 11/1994 |
| JP | 2003-193037 A | 7/2003 |
| WO | WO-01/36554 A1 | 5/2001 |
| WO | WO-01/36555 A1 | 5/2001 |
| WO | WO-2004/053456 A3 | 6/2004 |

OTHER PUBLICATIONS

English language abstract of JP-A-9-204657 (Aug. 5, 1997).
English language abstract of JP-A-11-167715 (Jun. 22, 1999).
English language abstract of JP-A-11-246849 (Sep. 14, 1999).
English language abstract of JP-A-2003-155471 (May 30, 2003).
English language abstract of JP-A-2003-147337 (May 21, 2003).

* cited by examiner

*Primary Examiner*—Michael Marcheschi
(74) *Attorney, Agent, or Firm*—Birch, Stewart, Kolasch & Birch, LLP

(57) ABSTRACT

A polishing composition is provided containing an abrasive having an average particle size of from 1 to 30 nm and water, wherein the abrasive has a packing ratio of from 79 to 90% by weight; a method for manufacturing a substrate, including the steps of introducing the above polishing composition between a substrate and a polishing pad, and polishing the substrate, while contacting the substrate with the polishing composition; and a method for reducing scratches of a substrate to be polished, including the step of polishing the substrate to be polished with the above polishing composition. The polishing composition is suitable for polishing substrates for precision parts including, for example, substrates for magnetic recording media, such as magnetic disks, and opto-magnetic disks, photomask substrates, optical disks, optical lenses, optical mirrors, optical prisms and semiconductor substrates, and the like.

14 Claims, No Drawings

POLISHING COMPOSITION

FIELD OF THE INVENTION

The present invention relates to a polishing composition, a method for manufacturing a substrate including the step of polishing the substrate with the polishing composition, and a method for reducing scratches of a substrate to be polished.

BACKGROUND OF THE INVENTION

In recent memory hard disk drives, high storage capacity and miniaturization have been demanded. In order to increase the recording density, it has been strongly urged to lower the flying height of a magnetic head and to reduce the unit recording area. Along with this trend, the surface qualities required after polishing have become severely assessed every year even in a manufacturing step for a substrate for a magnetic disk. In order to satisfy the lowering of flying height of the magnetic head, the surface roughness, the microwaviness, the roll-off and projections are required to be reduced, and in order to satisfy the reduction in unit recording area, the acceptable number of scratches per one side of the substrate has been reduced, and the sizes and depths of the scratches have become increasingly smaller.

Also, in the field of semiconductors, highly integrated circuits and higher speed at the operating frequencies have been advanced, and the production of thinner wiring is required especially in highly integrated circuits. As a result, in the method for manufacturing a substrate for semiconductors, since the focal depth becomes more shallow with the increase in resolution required for an exposure device during the exposure of a photoresist, even more improvement in surface smoothness and planarization is desired.

In order to meet the above requirements, a polishing composition for reducing surface roughness (Ra, Rmax), scratches, pits, projections and the like, and improving surface planarization has been proposed (JP-A-Hei-9-204657, JP-A-Hei-11-167715, and JP-A-Hei-11-246849), in which the problem of "micro scratches" (which are scratches having a broad width and very shallow depth (depth of 0.1 nm or more and less than 5 nm, width of 10 μm or more and less than 50 μm, and length of 10 μm or more and less than 1000 μm)) has been solved by adding a finishing polishing step with colloidal silica. In addition, a polishing composition for the purpose of reducing micro scratches has been proposed (JP2003-155471 A, and JP2003-147337 A).

In addition, for the purposes of an increase in the polishing rate and a reduction of surface defects, a polishing composition in which a fumed metal oxide and an abrasive such as colloidal silica are mixed has been disclosed (WO 2001-36554).

SUMMARY OF THE INVENTION

The present invention relates to:

[1] a polishing composition containing an abrasive having an average particle size of from 1 to 30 nm and water, wherein the abrasive has a packing ratio of from 79 to 90% by weight;

[2] a method for manufacturing a substrate, including the steps of introducing a polishing composition containing an abrasive having a packing ratio of from 79 to 90% by weight between a substrate and a polishing pad, and polishing the substrate, while contacting the substrate with the polishing composition;

[3] a method for manufacturing a substrate including the step of polishing the substrate to be polished with the polishing composition as defined in the above [1]; and

[4] a method for reducing scratches of a substrate to be polished, including the step of polishing the substrate to be polished with a polishing composition containing an abrasive having an average particle size of from 1 to 30 nm and water, wherein the abrasive has a packing ratio adjusted to 79 to 90% by weight of the polishing composition.

DETAILED DESCRIPTION OF THE INVENTION

The present invention relates to a polishing composition capable of making the surface roughness of a polished object small and remarkably reducing nano scratches of the polished object, and also economically performing the polishing; a method for manufacturing a substrate having small surface roughness and remarkably reduced nano scratches; and a method for reducing scratches of a substrate to be polished. In addition, the present invention relates to a polishing composition having a high polishing rate.

By using the polishing composition of the present invention in a polishing step for a substrate for precision parts used for high density or high integration, the polished substrate has excellent surface smoothness, so that conventionally undetectable fine nano scratches can be remarkably reduced. Therefore, there are exhibited an effect that a substrate for precision parts, such as a high-quality memory hard disk substrate and a semiconductor substrate, having excellent surface properties can be economically manufactured in a short period of time.

These and other advantages of the present invention will be apparent from the following description.

The present invention will be described in detail hereinbelow.

1. Polishing Composition

One of the features of the polishing composition of the present invention resides in that the polishing composition contains an abrasive having an average particle size of from 1 to 30 nm and water, wherein the abrasive has a packing ratio of from 79 to 90% by weight. Since the polishing composition contains an abrasive having an increased packing ratio, the polished substrate obtained with the polishing composition has excellent surface properties while maintaining a high polishing rate, and remarkably reduced nano scratches which can cause defects. The nano scratch is a property which is important for high density or high integration especially in a memory hard disk substrate or semiconductor substrate. Therefore, since the polishing composition of the present invention is used, a high-quality memory hard disk substrate or semiconductor substrate having excellent surface properties can be manufactured.

However, the substrate obtained when polished with the above-mentioned polishing composition is unsatisfactory in the quality of the substrate for high density, such as high capacity or high integration. As a result of studies for the causes for unsatisfactory qualities, the present inventors have found for the first time that the reduction of conventionally undetectable "nano scratches" (fine scratches on a substrate surface having a depth of 10 nm or more and less than 100 nm, a width of 5 nm or more and less than 500 nm, and a length of 100 μm or more) is insufficient. The present inventors have clarified that the quality of the substrate can be improved and the polishing rate can be increased by adjusting a packing ratio of the abrasive in the polishing composition. The present invention has been perfected thereby. In addition, when an abrasive having a small average particle size is used for improving surface roughness, the resulting polishing composition has a drastically lowered polishing rate, so that the polishing time has to be made longer.

Although not wanting to be limited by theory, the mechanisms for reduction of nano scratches by adjusting the packing ratio of the abrasive have not been elucidated, but the mechanisms are presumably as follows. For example, "nano scratches" of which the depth is deep, which can be remarkably reduced in the present invention, are considered to be generated by "foreign substances" (aggregate or coarse grains) contained in the abrasive, in contrast to conventionally known "micro scratches" of which depth is shallow, which are generated by corrosion of the substrate surface caused by chemicals. In other words, the polishing is carried out by applying a given load; when the packing ratio is low, the stress is concentrated on the "foreign substances," so that the "foreign substances" are locally pressed onto the substrate surface, thereby generating nano scratches. However, in the polishing composition containing an abrasive having a high packing ratio as in the present invention, since the "foreign substances" are surrounded by the abrasive particles, the stress is more likely to be dispersed on the substrate and the generation of nano scratches is mitigated. In addition, when the packing ratio of the abrasive particles is high, the contact area of the substrate with the abrasive particles is increased. Further, physical abrasive force is increased by suppressing the slipping of the abrasive particles without friction on the surface to be polished. Thus, the polishing rate increases.

In the present invention, the packing ratio of the abrasive can be obtained by the following method.

<Method of Obtaining Packing Ratio>

1) The amount of 25.0 g of a polishing composition is weighed in a container made from polyallomer (40PA bottle), commercially available from Hitachi Koki Co., Ltd., and a lid at the top of the bottle is tightly sealed.
2) Using an ultracentrifugator "TYPE: CP56G," commercially available from Hitachi Koki Co., Ltd. (maximum speed: 56,000 r/m, voltage: 200V, 50/60 Hz, CUP: 30A, MFG. No: N0008) at a temperature of 25° C., continuous operation is carried out at 20000 r/m for 10 hours.
3) By the centrifugation, water contained in the upper portion of the container and the abrasive contained in the lower portion thereof are separated from each other, so that the abrasive is compressed in the lower portion of the container to be precipitated (the precipitates being referred to as "cake"). The water in the upper portion of the container is carefully removed with a pipette, and water droplets deposited on the inner wall of the container and water remaining in the upper portion of the precipitated cake are wiped off to remove only water with a filter paper without allowing the filter paper to make contact with the cake by tilting the bottle, and the weight of the precipitated cake (A) is accurately determined. The precipitated cake (A) is composed of sediments of the abrasive particles, and water is present between the particles.
4) This precipitated cake (A) is dried with "ADVANTEC FC-610 FORCED CONVENTIONAL OVEN" commercially available from Toyo Seisakusho K.K. at 120° C. for 24 hours, and thereafter, the weight of the dried solid (B) is determined.

The packing ratio of the abrasive is calculated according to the following formula:

$$\text{Packing Ratio (\% by weight)} = (B/A) \times 100 \qquad (1)$$

The amount of weight reduction by drying corresponds to the weight of water which is present in the precipitated cake. Each of A and B may contain some additives in small amounts, but the numerical value obtained by the formula (1) is defined as the packing ratio of the abrasive without consideration of these additives.

The abrasive in the present invention has a packing ratio of from 79 to 90% by weight, preferably from 81 to 90% by weight, more preferably from 82 to 90% by weight, from the viewpoint of reduction of nano scratches.

The method of adjusting a packing ratio of the abrasive is not particularly limited. For example, when the abrasive is a colloidal silica, a desired packing ratio can be achieved by a method of mixing particles having various particle sizes by adding particles which serve as a new nucleus in the growing process of the abrasive particles in the preparation stage, a method of mixing two or more abrasive particles having different particle sizes, and the like. Alternatively, the packing ratio can be adjusted by making the repulsive force between the particles smaller by surface modification of the abrasive particles, or with an additive, or the like. In addition, the packing ratio can be adjusted by controlling the preparation conditions for the abrasive particles, thereby making the particles spherical, or smoothening the particle surface.

As the abrasive usable in the present invention, the abrasives that are generally used for polishing can be used. The abrasive includes metals; carbides of metals or metalloids, nitrides of metals or metalloids, oxides of metals or metalloids or borides of metals or metalloids; diamond, and the like. The elements for metals or metalloids include those elements belonging to the Group 2A, 2B, 3A, 3B, 4A, 4B, 5A, 6A, 7A or 8 of the Periodic Table (long period form).

Specific examples of the abrasives include aluminum oxide, silicon carbide, diamond, magnesium oxide, zinc oxide, titanium oxide, cerium oxide, zirconium oxide, silica and the like. It is preferable to use one or more kinds of these abrasives from the viewpoint of an increase in the polishing rate. Among them, aluminum oxide, fumed silica, colloidal silica, cerium oxide, zirconium oxide, titanium oxide, and the like are suitable for polishing a semiconductor wafer or a semiconductor element, or a substrate for precision parts such as a substrate for magnetic recording medium.

The shape of the abrasive is preferably a spherical colloidal particle, from the viewpoint of an increase in the packing ratio and obtainment of a smooth surface. Colloidal cerium oxide particles, colloidal silica particles, surface-modified colloidal silica particles and the like are even more preferable, from the viewpoint of reduction of nano scratches which are surface defects. Among them, the colloidal silica particles are even more preferable. Here, the colloidal silica particles can be obtained by a process, for example, forming colloidal silica particles from an aqueous silicic acid solution. The colloidal silica particles are suitable for use in the final polishing of a substrate for a high recording density memory magnetic disk, or for use in the polishing of a semiconductor device substrate, each requiring an even higher level of smoothness.

The abrasive has an average particle size of from 1 to 30 nm, from the viewpoint of smoothing the surface. The average particle size is preferably from 5 to 30 nm, more preferably from 10 to 25 nm. Incidentally, the average particle size of the abrasive is determined by using an image of primary particles of the abrasive observed with a scanning electron microscope (hereinafter referred to as SEM)(magnification preferably from 3000 to 100000). Here, the primary particle size of one particle employs an arithmetic mean of breadth and length (an average of length and breadth).

Even more preferably, in the polishing composition of the present invention, it is preferable that the abrasive has the above-mentioned packing ratio of from 79 to 90% by weight, and an average particle size of from 1 to 30 nm, from the viewpoint of an excellent effect of an increase in the polishing rate in addition to an effect of reduction of surface roughness.

The particle size of the abrasive particles can be obtained with a SEM according to the following method. An example of the determination of the particle size where the abrasive particles are silica particles is given hereinbelow.

1) A polishing composition containing silica particles is diluted with ethanol so as to have a concentration of the abrasive particles of 0.5% by weight. The diluted solution was uniformly coated on a sample plate for SEM heated to about 50° C. Thereafter, excess solution is wiped off with a filter paper, and the coated solution is evenly air-dried so that the silica particles are not aggregated.
2) Pt—Pd is vapor-deposited on the air-dried silica particles. Using a field emission scanning electron microscope (FE-SEM: Model S-4000) commercially available from Hitachi LTD., of which magnification is adjusted to 3000 to 100000 times so that about 500 silica particles can be observed within the scope, two pinpoints per one sample plate are observed and a microphotograph is taken thereat.
3) Each microphotograph taken (10.16 cm×12.7 cm) is enlarged to an A4 size (21.0 cm×29.7 cm) with a copy machine or the like, and the particle sizes of all the photographed silica particles are determined by calipers or the like and the data are summed up. The procedures are repeated for several runs, so that the number of silica particles to be determined is 2000 or more.

It is more preferable that the number of determination points by SEM is increased, from the viewpoint of obtaining an accurate particle size distribution. The particle size can be obtained by obtaining data for the determined particle sizes and summing up its frequency (%) from a smaller particle size, wherein a particle size at 50% of cumulative frequency is defined as an average particle size. The particle size as referred to herein is obtained as the size of the primary particle.

As to the abrasive other than the silica particles, when the polishing composition is in the state of slurry in which an abrasive is dispersed in a solvent such as water or an alcohol, the average particle size can be obtained in the same manner as in the above-mentioned silica. Specific examples of the abrasive include aluminum oxide, titanium oxide, zirconium oxide, zinc oxide or the like prepared by "build-up method." On the other hand, when the abrasive is powder, the sample is prepared by pasting an electroconductive tape on a sample plate for SEM, sprinkling the abrasive powder directly on the tape, and thereafter vapor-depositing Pt—Pd, and the average particle size of the sample can be obtained by carrying out the subsequent steps in the same manner as in the silica particles.

As specific examples, in the case where the particles, which contain fusing primary particles, are prepared by pulverization method, such as silicon carbide, diamond, aluminum oxide, cerium oxide, or fumed silica, the average particle size can be obtained by considering the fused particles as the primary particles.

The content of the abrasive is preferably 0.5% by weight or more, more preferably 1% by weight or more, even more preferably 3% by weight or mores even more preferably 5% by weight or more, of the polishing composition, from the viewpoint of an increase in the polishing rate. In addition, the content of the abrasive is preferably 20% by weight or less, more preferably 15% by weight or less, even more preferably 13% by weight or less, even more preferably 10% by weight or less, of the polishing composition, from the viewpoint of economic advantages.

In other words, the content of the abrasive is preferably from 0.5 to 20% by weight, more preferably from 1 to 15% by weight, even more preferably from 3 to 13% by weight, even more preferably from 5 to 10% by weight, of the polishing composition. These contents in the above-mentioned polishing composition may be any of the contents in the preparation of the polishing composition and the content upon use. In many cases, the polishing composition is usually prepared as a concentrate, which is diluted upon use.

The balance of the polishing composition of the present invention is water. Water in the present invention is not particularly limited, and includes ion-exchanged water, distilled water, ultrapure water and the like. The water content is preferably from 60 to 99% by weight, more preferably from 70 to 99% by weight, even more preferably from 80 to 98% by weight, even more preferably from 85 to 98% by weight, of the polishing composition.

It is preferable that the pH of the polishing composition of the present invention is determined depending upon the kinds of the object to be polished and the required properties. When the material for the object to be polished is a metal material, it is preferable that the pH is generally in an acidic range from the viewpoint of an increase in the polishing rate. For example, it is desired that the pH is 6.5 or less, preferably 6.0 or less, more preferably 5.0 or less, even more preferably 4.0 or less. In addition, from the viewpoint of influences to human bodies and corrosion of machines, it is desired that the pH is, for example, 0.1 or more, preferably 0.5 or more, more preferably 1.0 or more, even more preferably 1.4 or more. Especially, in the substrate for precision parts in which the metal of a nickel-phosphorus (Ni—P) plated aluminum alloy substrate is subjected to polishing, the pH is preferably in an acidic range, more preferably 6.5 or less, even more preferably 5.0 or less, even more preferably 4.0 or less, from the viewpoint of an increase in the polishing rate. Therefore, the pH may be set in accordance with its purposes that are considered to be important. Especially, in the substrate for precision parts in which the metal of a nickel-phosphorus (Ni—P) plated aluminum alloy substrate is subjected to polishing, the pH is preferably from 0.1 to 6.5, more preferably from 1.0 to 4.5, even more preferably from 1.4 to 3.5, taking into consideration the above-mentioned viewpoint.

The pH can be adjusted with the following acid or salt. Specific examples of the acid or salt include inorganic acids such as nitric acid, sulfuric acid, nitrous acid, persulfuric acid, hydrochloric acid, perchloric acid, phosphoric acid, phosphonic acid, phosphinic acid, pyrophosphoric acid, tripolyphosphoric acid, and amide sulfuric acid, or salts thereof; organic phosphonic acids such as 2-aminoethylphosphonic acid, 1-hydroxyethylidene-1,1-diphosphonic acid, aminotri(methylenephosphonic acid), ethylenediaminetetra(methylenephosphonic acid), diethylenetriaminepenta(methylenephosphonic acid), ethane-1,1-diphosphonic acid, ethane-1,1,2-triphosphonic acid, ethane-1-hydroxy-1, 1-diphosphonic acid, ethane-1-hydroxy-1,1,2-triphosphonic acid, ethane-1,2-dicarboxy-1,2-diphosphonic acids, methanehydroxyphosphonic acid, 2-phosphonobutane-1,2-dicarboxylic acids, 1-phosphonobutane-2,3,4-tricarboxylic acids, and α-methylphophonosuccinic acid, or salts thereof; aminocarboxylic acids such as glutamic acid, picolinic acid, and aspartic acid, or salts thereof; carboxylic acids, such as oxalic acid, nitroacetic acid, maleic acid and oxaloacetic acid, or salts thereof; and the like. Among them, the inorganic acids, the organic phosphonic acids and salts thereof are preferable from the viewpoint of reduction of nano scratches.

In addition, among the inorganic acids or salts thereof, nitric acid, sulfuric acid, hydrochloric acid, perchloric acid, or a salt thereof is more preferable. Among the organic phosphonic acids or salts thereof, 1-hydroxyethylidene-1,1-diphosphonic acid, aminotri(methylenephosphonic acid), ethylenediaminetetra(methylenephosphonic acid), diethylenetriaminepenta(methylenephosphonic acid), or a salt thereof is more preferable. These acids or salts thereof may be used alone in admixture of two or more kinds.

The counterion (cation) of these salts is not particularly limited. Specific examples of the counterion of these salts include salts with a metal ion, ammonium ion, or an alkylammonium ion. Specific examples of the metal include the metals belonging to the Group 1A, 1B, 2A, 2B, 3A, 3B, 4A, 6A, 7A or 8 of the Periodic Table (long period form). The ammonium ion or the metal belonging to the Group 1A of the periodic table is preferable, from the viewpoint of reduction of nano scratches.

In addition, there can be added other component to the polishing composition of the present invention as occasion demands. The other component includes, for example, thickeners, dispersing agents, anticorrosive agents, basic substances, surfactants, and the like. In addition, although it cannot be generally limited depending upon the materials of the object to be polished, in general, an oxidizing agent can be added to the metal material, from the viewpoint of an increase in the polishing rate. The oxidizing agent includes hydrogen peroxide, permanganic acid, chromic acid, nitric acid, peroxo acid, oxyacid, or salts thereof, and oxidizable metal salts.

The polishing composition of the present invention can be prepared by mixing an abrasive having an average particle size of from 1 to 30 nm and water, wherein the abrasive has a packing ratio of from 79 to 90% by weight, and an oxidizing agent, an acid or a salt thereof, and other components as occasion demands by a known method.

By polishing an object to be polished with the polishing composition having the above constitution, a substrate, such as a substrate for precision parts, having remarkably reduced nano scratches and excellent surface properties can be manufactured at an economically productive rate. Therefore, the present invention also relates to a method for manufacturing the substrate.

The term "nano scratches" in the present invention refers to fine scratches on a substrate surface, having a depth of 10 nm or more and less than 100 nm, a width of 5 nm or more and less than 500 nm, and a length of 100 μm or more, and being detectable by an interatomic force microscope (AFM). The nano scratches can be quantitatively evaluated as the number of nano scratches by "MicroMax," which is a visual testing device as described in Examples set forth below.

In addition, the surface roughness, which is a measure of surface smoothness is not limited in the evaluation method. In the present invention, the surface roughness is evaluated as a roughness determinable at a short wave length of 10 μm or less in the AFM (interatomic force microscope), and is expressed as an average surface roughness Ra. Specifically, the surface roughness is obtained according to the method set forth in Examples below.

The material for the object to be polished such as a substrate to be polished suitably used in the present invention includes, for example, metals or metalloids such as silicon, aluminum, nickel, tungsten, copper, tantalum and titanium and alloys which contain these metals; glassy substances such as glass, glassy carbon and amorphous carbons; ceramic materials such as alumina, silicon dioxide, silicon nitride, tantalum nitride, and titanium carbide; resins such as polyimide resins; and the like. Among them, it is preferable that an object to be polished is made of a metal such as aluminum, nickel, tungsten or copper, or made of an alloy containing these metals as the main components. For example, a substrate made of an aluminum alloy plated with Ni—P or a glass substrate made of crystallized glass, reinforced glass or the like is more preferable, and the substrate made of an aluminum alloy plated with Ni—P is even more preferable.

The shape for the object to be polished is not particularly limited. For example, those having shapes containing planar portions such as discs, plates, slabs and prisms, or shapes containing curved portions such as lenses can be subjects for polishing with the polishing composition of the present invention. Among them, those having the disc-shaped objects to be polished are even more preferable in polishing.

The polishing composition of the present invention can be preferably used in polishing a substrate for precision parts. For example, the polishing composition is suitable for polishing substrates for magnetic recording media, such as magnetic disks such as memory hard disks, optical disks, opto-magnetic disks, and photomask substrates, optical lenses, optical mirrors, optical prisms and semiconductor substrates, and the like. Among them, since the polishing composition of the present invention can remarkably reduce nano scratches important in high density or high integration, the polishing composition is more preferable for polishing a magnetic disk substrate such as memory hard disk substrate, or a semiconductor substrate, even more preferable for polishing the magnetic disk substrate.

The polishing of a memory hard disk substrate or a semiconductor substrate includes, for instance, the steps of polishing a silicon wafer (bare wafer), forming a film for shallow trench isolation, subjecting an interlayer dielectric to planarization, forming an embedded metal line, and forming an embedded capacitor, and the like.

2. Method for Manufacturing Substrate

The method for manufacturing a substrate of the present invention is a method including the step of polishing a substrate to be polished with a polishing composition. Specifically, in the step of polishing, the polishing can be carried out by feeding the polishing composition of the present invention to a polishing machine equipped with jigs for supporting a substrate to be polished and a polishing pad. According to this method, the polishing rate of the substrate to be polished can be increased, while the surface roughness of the substrate is made smaller and the nano scratches are remarkably reduced.

The surface of the substrate to be polished is polished by the step of polishing a surface of an object to be polished by pressing the above-mentioned jigs for supporting the object to be polished against polishing platens to which a polishing pad, such as one made of an organic polymer-based foamed article or a non-foamed article, or a nonwoven polishing pad, is attached, or alternatively by setting the substrate to be polished with polishing platens to which the polishing pad is attached, feeding the above-mentioned polishing composition to a surface of the substrate to be polished, and moving the polishing platens or the substrate to be polished, while applying a given pressure.

The polishing load during the step of polishing is preferably from 0.5 to 20 kPa, more preferably from 1 to 20 kPa, even more preferably from 3 to 20 kPa, from the viewpoint of an increase in the polishing rate and easy control of polishing.

The flow rate of the polishing composition to a substrate to be polished is preferably from 0.01 to 3 mL/minute, more preferably from 0.05 to 2.5 mL/minute, even more preferably from 0.1 to 2 mL/minute, per 1 $cm^2$ of the substrate, from the viewpoint of an increase in the polishing rate and easy control of nano scratches.

In addition, the method for manufacturing a substrate of the present invention includes the following steps:

introducing a polishing composition containing an abrasive having a packing ratio of from 79 to 90% by weight between a substrate and a polishing pad, and polishing the substrate, while contacting the substrate with the polishing composition.

Even when the above-mentioned method for manufacturing a substrate is used, there are exhibited some effects that the polished object has small surface roughness, and the nano scratches can be remarkably reduced.

In addition, the abrasive usable in the method for manufacturing a substrate may be the same ones as those usable in the polishing composition of the present invention mentioned above.

Among them, in the method for manufacturing a substrate according to the above embodiment, the abrasive has an average particle size of preferably from 1 to 30 nm, more preferably from 5 to 30 nm, even more preferably from 10 to 25 nm, from the viewpoint of smoothening the surface of the substrate to be polished.

As mentioned above, by polishing a substrate to be polished with the polishing composition of the present invention, or the above-mentioned polishing composition containing an abrasive having a packing ratio of from 79 to 90% by weight, the surface defects of the substrate, especially nano scratches, can be remarkably reduced, whereby a substrate having a more excellent surface quality with even lower surface roughness can be manufactured.

Specifically, the method of polishing includes the steps of putting the substrate to be polished between polishing platens to which a nonwoven, organic polymer-based polishing pad is attached, feeding the polishing composition to the surface of the substrate, and moving the polishing platens or the substrate, while applying a given pressure.

The surface properties of the substrate to be polished before subjecting to the step of polishing the substrate to be polished with the polishing composition are not particularly limited. For example, those substrates having surface properties that surface roughness (Ra) is 1 nm are preferable.

The above-mentioned polishing step may be preferably carried out in the second or subsequent step among the plural polishing steps, and it is even more preferable to carry out the polishing step as a final polishing step. In this polishing step, in order to avoid admixing of the abrasive of the previous step or the polishing composition, separate polishing machines may be used. And when the separate polishing machines are used, it is preferable to clean the substrate for each step. Here, the polishing machines are not particularly limited.

The polishing composition of the present invention is especially effective in the polishing step, and the polishing composition can be similarly applied to grinding steps other than this, for example, lapping step, and the like.

The substrate manufactured by using the polishing composition of the present invention or using the method for manufacturing a substrate of the present invention as described above has excellent surface smoothness. For example, those substrates having surface roughness (Ra) of 0.3 nm or less, preferably 0.2 nm or less, more preferably 0.15 nm or less, even more preferably 0.13 nm or less are obtained.

Also, the manufactured substrate has very little nano scratches. Therefore, when the substrate is, for example, a memory hard disk substrate, the substrate can meet the requirement of a recording density of 80 G bits/$inch^2$, preferably 120 G bits/$inch^2$, more preferably 160 G bits/$inch^2$ or even higher, and when the substrate is a semiconductor substrate, the substrate can meet the requirement of a wire width of preferably 65 nm, and more preferably 45 nm.

3. Method for Reducing Scratches on Substrate to Be Polished

In addition, the present invention relates to a method for reducing scratches on a substrate to be polished with the polishing composition (hereinafter simply referred to as "scratch-reducing method").

One of the features of the scratch-reducing method of the present invention resides in that the method includes the step of polishing the substrate to be polished with a polishing composition containing an abrasive and water, wherein the abrasive having an average particle size of from 1 to 30 nm has a packing ratio adjusted to 79 to 90% by weight of the polishing composition. By having the feature, the scratches on the substrate to be polished can be reduced.

The packing ratio may be the same as that mentioned above.

A method for adjusting to a given packing ratio as mentioned above includes, for example, a method including the step of mixing two or more polishing compositions having different compositions (for example, a polishing composition containing two or more abrasives having different particle sizes) in a feed pipe for the polishing composition and/or on the substrate; and a method including the step of mixing a polishing composition containing an abrasive with an additive solution containing an additive.

Incidentally, as long as the mixture after mixing satisfies the requirement of the packing ratio, each solution before mixing does not have to satisfy the requirement of the packing ratio.

The abrasive and water usable in the scratch-reducing method of the present invention may be the same as those used in the polishing composition of the present invention mentioned above.

Therefore, in the scratch-reducing method of the present invention, the polishing composition of the present invention is suitably used.

Among them, the abrasive has an average particle size of from 1 to 30 nm, preferably from 5 to 30 nm, more preferably from 10 to 25 nm, from the viewpoint of smoothening the surface of the substrate to be polished.

In addition, the polishing step may be the same as the polishing step using the polishing composition of the present invention as mentioned above.

Among them, the polishing pad is pressed with a polishing load of preferably from 0.5 to 20 kPa, more preferably from 1 to 20 kPa, even more preferably from 3 to 20 kPa, from the viewpoint of an increase in the polishing rate and the easy control of polishing.

In addition, the polishing is carried out by pressing the polishing pad while feeding the polishing composition at the flow rate of preferably from 0.01 to 3 mL/minute, more preferably from 0.05 to 2.5 mL/minute, even more preferably from 0.1 to 2 mL/minute, per 1 cm² of the substrate to be polished, from the viewpoint of an increase in the polishing rate and the reduction of nano scratches.

EXAMPLES

The following examples further describe and demonstrate embodiments of the present invention. The examples are given solely for the purposes of illustration and are not to be construed as limitations of the present invention.

A Ni—P-plated substrate used as a substrate to be polished was previously roughly polished with a polishing composition containing an alumina abrasive, and polishing was evaluated with an aluminum alloy substrate having a thickness of 0.8 mm and a diameter of 95 mm in which the surface roughness (AFM-Ra) was adjusted to 1 nm, and the waviness (Wa) was adjusted to 4.8 nm.

Examples 1 to 12 and Comparative Examples 1 to 11

Each of the polishing compositions having the components shown in Table 1 or 2 was prepared. There were added and mixed together sulfuric acid (98% by weight product, commercially available from Wako Pure Chemical Industries) and/or an aqueous solution of HEDP (1-hydroxyethylidene-1,1-diphosphonic acid, 60% by weight product, commercially available from SOLUTIA JAPAN INC.), and an aqueous hydrogen peroxide as desired (35% by weight product, commercially available from ASAHI DENKA KOGYO K.K.), and finally a colloidal silica slurry (30 to 40% by weight product, medium: water) was added to the resulting mixture while stirring.

TABLE 1

| | A | B | C | D | E | HEDP | Sulfuric Acid |
|---|---|---|---|---|---|---|---|
| Ex. 1 | 7.0 | — | — | — | — | 2.0 | — |
| Ex. 2 | 4.9 | 2.1 | — | — | — | 0.14 | — |
| Ex. 3 | 2.1 | 4.9 | — | — | — | 2.0 | — |
| Ex. 4 | 3.5 | 3.5 | — | — | — | 0.05 | — |
| Ex. 5 | 3.5 | 3.5 | — | — | — | 2.0 | — |
| Comp. Ex. 1 | — | — | 7.0 | — | — | 2.0 | — |
| Comp. Ex. 2 | — | 7.0 | — | — | — | 2.0 | — |
| Comp. Ex. 3 | — | — | — | 7.0 | — | 2.0 | — |
| Comp. Ex. 4 | 3.5 | — | — | 3.5 | — | 2.0 | — |
| Comp. Ex. 5 | — | — | — | — | 7.0 | 2.0 | — |

In the table, the numbers are expressed by % by weight, the balance of the polishing composition being water.

TABLE 2

| | A | B | C | D | E | Hydrogen Peroxide | HEDP | Sulfuric Acid |
|---|---|---|---|---|---|---|---|---|
| Ex. 6 | 7.0 | — | — | — | — | 0.6 | 2.0 | — |
| Ex. 7 | 4.9 | 2.1 | — | — | — | 0.6 | 2.0 | — |
| Ex. 8 | 3.5 | 3.5 | — | — | — | 0.6 | 0.14 | 0.4 |
| Ex. 9 | 2.8 | 4.2 | — | — | — | 0.6 | 0.14 | 0.4 |
| Ex. 10 | 2.1 | 4.9 | — | — | — | 0.6 | 2.0 | — |
| Ex. 11 | 3.5 | 3.5 | — | — | — | 0.3 | 2.0 | — |
| Ex. 12 | 3.5 | 3.5 | — | — | — | 0.6 | 2.0 | — |
| Comp. Ex. 6 | — | — | 7.0 | — | — | 0.6 | 2.0 | — |
| Comp. Ex. 7 | — | 7.0 | — | — | — | 0.6 | 2.0 | — |
| Comp. Ex. 8 | — | — | — | 7.0 | — | 0.6 | 2.0 | — |
| Comp. Ex. 9 | 3.5 | — | — | 3.5 | — | 0.6 | 2.0 | — |
| Comp. Ex. 10 | — | — | — | — | 7.0 | 0.6 | 2.0 | — |
| Comp. Ex. 11 | — | 7.0 | — | — | — | 0.6 | 0.02 | — |

In the table, the numbers are expressed by % by weight, the balance of the polishing composition being water.

Here, in the tables, each of A to E is a colloidal silica used in the above-mentioned colloidal silica slurry.

| A: | a product commercially available from Du Pont K.K. (average particle size: 27 nm) |
|---|---|
| B: | a product commercially available from Du Pont K.K. (average particle size: 17 nm) |
| C: | a product commercially available from Nissan Chemical Industries, Ltd. (average particle size: 15 nm) |
| D: | a product commercially available from Du Pont K.K. (average particle size: 40 nm) |
| E: | a product commercially available from Nissan Chemical Industries, Ltd. (average particle size: 10 nm) |

The packing ratio of the abrasive, pH of the polishing composition, the nano scratches, and the surface roughness (AFM-Ra) for each of the polishing compositions obtained in Examples 1 to 12 and Comparative Examples 1 to 11 were determined and evaluated according to the following methods. The results are shown in Tables 3 and 4.

I-1. Polishing Conditions
Polishing processing machine: double-sided 9B polishing machine, commercially available from SPEEDFAM CO., LTD.
Polishing pad: a polishing pad made of polyurethane, commercially available from FUJIBO)
Rotational speed of a platen: 32.5 r/min
Flow rate for a polishing composition: 100 mL/min
Polishing time period: 4 minutes
Polishing pressure: 7.8 kPa
Number of substrates introduced: 10

I-2. Determination Conditions for Packing Ratio
The packing ratio was determined in accordance with the method described above.

I-3. Determination Conditions for pH
The pH of the polishing composition was directly determined by using a pH meter (a glass-type hydrogen ion concentration indicator "HM-30G," commercially available from Toa Denpa Kogyo).

I-4. Determination Conditions for Polishing Rate
The polishing rate of both the sides per unit time (μm/min) was calculated by dividing a weight difference (g) before and after the polishing test by the density (8.4 g/cm$^3$) of an object to be polished, and further dividing the resultant quotient by the surface area (65.97 cm$^2$) of the disk and the polishing time period.

I-5. Determination Conditions for Nano Scratches

Measurement equipment: "Micromax VMX-2100CSP" (commercially available from VISION PSYTEC CO., LTD.)

Light source: 2Sλ (250 W) and 3Pλ (250 W) being both 100%

Tilt angle: −6°

Magnification: maximum (scope of vision: 1/120 of the entire area)

Observed range: entire area (a substrate having an outer diameter of 95 mm and an inner diameter of 25 mm)

Iris: notch

Evaluation: Four pieces of substrates were randomly selected from those substrates introduced into the testing machine, and a total of the number of nano scratches on each of both sides of the four substrates was divided by 8 to calculate the number of nano scratches per side of the substrate.

I-6. Determination Conditions for Surface Roughness (AFM-Ra)

Measurement equipment: "Nanoscope III, Dimension 3000" commercially available from Digital Instruments Scan rate: 1.0 Hz Scan area: 2×2 μm Evaluation: Determinations for the average surface roughness (AFM-Ra) were taken on three areas on each of both the sides per one disk evenly in a circumferential direction at the equidistance from both the inner circumference and the outer circumference of the disk for a total of 6 points, and an average of the determinations was defined as the average surface roughness.

Here, in the present invention, those substrates having nano scratches of 200 or less, and AFM-Ra of 0.2 nm or less are acceptable products.

TABLE 3

| | Packing Ratio (% by wt.) | Average Particle Size (nm) | pH | Nano Scratches (number/side) | Polishing Rate (μm/min) | AFM-Ra (nm) |
|---|---|---|---|---|---|---|
| Ex. 1 | 80.0 | 27 | 1.5 | 36 | 0.04 | 0.18 |
| Ex. 2 | 81.5 | 24 | 1.5 | 22 | 0.05 | 0.15 |
| Ex. 3 | 80.6 | 18 | 1.5 | 46 | 0.06 | 0.10 |
| Ex. 4 | 80.0 | 22 | 7.0 | 158 | 0.05 | 0.13 |
| Ex. 5 | 82.3 | 22 | 1.5 | 10 | 0.06 | 0.13 |
| Comp. Ex. 1 | 78.1 | 15 | 1.5 | 488 | 0.02 | 0.11 |
| Comp. Ex. 2 | 78.0 | 17 | 1.5 | 364 | 0.02 | 0.10 |
| Comp. Ex. 3 | 81.0 | 40 | 1.5 | 125 | 0.06 | 0.25 |
| Comp. Ex. 4 | 81.6 | 34 | 1.5 | 83 | 0.06 | 0.23 |
| Comp. Ex. 5 | 77.8 | 10 | 1.5 | 1200 | 0.02 | 0.09 |

TABLE 4

| | Packing Ratio (% by wt.) | Average Particle Size (nm) | pH | Nano Scratches (number/side) | Polishing Rate (μm/min) | AFM-Ra (nm) |
|---|---|---|---|---|---|---|
| Ex. 6 | 80.0 | 27 | 1.5 | 35 | 0.12 | 0.18 |
| Ex. 7 | 81.5 | 24 | 1.5 | 20 | 0.14 | 0.15 |
| Ex. 8 | 82.3 | 22 | 1.5 | 44 | 0.15 | 0.13 |
| Ex. 9 | 82.1 | 20 | 1.5 | 24 | 0.13 | 0.11 |
| Ex. 10 | 80.6 | 18 | 1.5 | 26 | 0.12 | 0.10 |
| Ex. 11 | 80.0 | 22 | 7.0 | 146 | 0.06 | 0.13 |
| Ex. 12 | 82.3 | 22 | 1.5 | 13 | 0.14 | 0.13 |
| Comp. Ex. 6 | 78.1 | 15 | 1.5 | 456 | 0.07 | 0.11 |
| Comp. Ex. 7 | 78.0 | 17 | 1.5 | 356 | 0.08 | 0.10 |
| Comp. Ex. 8 | 81.0 | 40 | 1.5 | 445 | 0.13 | 0.25 |
| Comp. Ex. 9 | 81.6 | 34 | 1.5 | 312 | 0.13 | 0.23 |
| Comp. Ex. 10 | 77.8 | 10 | 1.5 | 1021 | 0.06 | 0.09 |
| Comp. Ex. 11 | 78.0 | 17 | 7.0 | 2203 | 0.04 | 0.10 |

It can be seen from the results of Tables 3 and 4, as shown in Examples 1 to 12, when the abrasive has a packing ratio of from 79 to 90% by weight, and also an average particle size of from 1 to 30 nm, the nano scratches on the resulting substrate polished with the polishing composition are remarkably lowered, the polishing rates are high, and further the surface roughness is 0.2 nm or less.

In addition, as shown in Comparative Examples 1, 2, 5, 6, 7, 10, and 11, when the abrasive has a low packing ratio, the resulting substrate polished with the polishing composition obtained has numerous nano scratches, and as shown in Comparative Examples 3, 4, 8, and 9, when the abrasive has an average particle size exceeding 30 nm, the resulting substrate polished with the polishing composition obtained has large surface roughness, even if the abrasive has a packing ratio as high as 79% by weight or more.

Examples 13 and 14 and Comparative Example 12

Polishing was evaluated with a reinforced glass substrate having an outer circumference of 65 mm, an inner circumference of 20 mm, a thickness of 0.65 mm, and Ra of 4.0 Å.

A polishing composition as shown in Table 5 was prepared. At least one of the colloidal silica slurries A to C was added to an aqueous hydrochloric acid solution (36% by weight product, commercially available from Wako Pure Chemical Industries) while stirring. Here, each of the colloidal silica slurries A to C are the same as those mentioned above.

TABLE 5

| | A | B | C | Hydrochloric Acid |
|---|---|---|---|---|
| Ex. 13 | 10.0 | — | — | 0.24 |
| Ex. 14 | 5.0 | 5.0 | — | 0.24 |
| Comp. Ex. 12 | — | — | 10.0 | 0.25 |

In the table, the numbers are expressed by % by weight, the balance of the polishing composition being water.

The packing ratio and the average particle size of the abrasive, the pH and the polishing rate of the polishing composition, and the surface roughness (AFM-Ra) for the polishing compositions obtained in Examples 13 and 14 and Comparative Example 12 were determined and evaluated in accordance with the following methods. The results obtained are shown in Table 6.

II-1. Polishing Conditions
Polishing test machine: MA-300, commercially available from Musasino Denshi K.K. (single-sided polishing machine, platen diameter: 300 mm, carrier forced driving)
Polishing pad: a polishing pad made from suede, commercially available from Kanebo, LTD.
Rotational speed of platen: 90 r/min
Rotational speed of carrier: 90 r/min
Flow rate for a polishing composition: 50 mL/min
Polishing time period: 10 minutes
Polishing load: 14.7 kPa
Number of substrate introduced in a single polishing: 1

Here, the determination conditions for the average particle size and the packing ratio of the abrasive and pH of the polishing composition are the same as those in Example 1.

II-2. Determination Conditions for Polishing Rate

The polishing rate of a single side per unit time (μm/min) was calculated by dividing a weight difference (g) before and after the polishing test by the density (2.41 g/cm$^3$) of an object to be polished, and further dividing the resultant quotient by the surface area (30.04 cm$^2$) of the disk and the polishing time period.

II-3. Determination Conditions for Surface Roughness (AFM-Ra)

The determination equipment and the evaluation method were the same as in Example 1.

Here, in the case of the glass substrate, those having AFM-Ra of 0.3 nm or less are considered as acceptable products.

TABLE 6

| | Packing Ratio (% by wt.) | Average Particle Size (nm) | pH | Polishing Rate (μm/min) | AFM-Ra (nm) |
|---|---|---|---|---|---|
| Ex. 13 | 80.0 | 27 | 1.5 | 0.24 | 0.29 |
| Ex. 14 | 82.3 | 22 | 1.5 | 0.26 | 0.22 |
| Comp. Ex. 12 | 78.1 | 15 | 1.5 | 0.14 | 0.15 |

It can be seen from the results of Table 6 that as shown in Examples 13 and 14, if the abrasive has a packing ratio of from 79 to 90% by weight, and further an average particle size of from 1 to 30 nm, the substrate polished by the polishing composition obtained has a surface roughness of 0.25 nm or less, and further the polishing rate is remarkably high. In addition, as shown in Comparative Example 12, if the abrasive has a low packing ratio, the polishing composition has a lowered polishing rate.

The polishing composition of the present invention is suitable for polishing substrates for precision parts including, for instance, substrates for magnetic recording media, such as magnetic disks, and opto-magnetic disks, photomask substrates, optical disks, optical lenses, optical mirrors, optical prisms and semiconductor substrates, and the like.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polishing composition comprising an abrasive having an average particle size of from 1 to 30 nm and water, wherein the abrasive has a packing ratio of from 79 to 90% by weight, wherein the packing ratio is calculated according to formula (1):

$$\text{Packing ratio (\% by weight)} = (B/A) \times 100 \qquad (1)$$

wherein A is the weight of a precipitated cake composed of sediments of the abrasive particles, and B is the weight of dried solid of the precipitated cake.

2. The polishing composition according to claim 1, wherein the abrasive is colloidal particles.

3. The polishing composition according to claim 1, wherein the polishing composition has a pH of from 0.1 to 6.5.

4. The polishing composition according to claim 2, wherein the polishing composition has a pH of from 0.1 to 6.5.

5. A method for manufacturing a substrate, comprising the steps of introducing a polishing composition comprising an abrasive having a packing ratio of from 79 to 90% by weight between a substrate and a polishing pad, and polishing the substrate, while contacting the substrate with the polishing composition, wherein the packing ratio is calculated according to formula (1):

$$\text{Packing ratio (\% by weight)} = (B/A) \times 100 \qquad (1)$$

wherein A is the weight of a precipitated cake composed of sediments of the abrasive particles, and B is the weight of dried solid of the precipitated cake.

6. The method according to claim 5, wherein the abrasive has an average particle size of from 1 to 30 nm.

7. A method for manufacturing a substrate comprising the step of polishing the substrate to be polished with the polishing composition as defined in claim 1.

8. A method for manufacturing a substrate comprising the step of polishing the substrate to be polished with the polishing composition as defined in claim 2.

9. A method for manufacturing a substrate comprising the step of polishing the substrate to be polished with the polishing composition as defined in claim 3.

10. The method according to claim 5, wherein the polishing pad is pressed with a polishing load of from 0.5 to 20 kPa.

11. The method according to claim 5, wherein the polishing pad is pressed against the substrate to be polished, while feeding the polishing composition at a rate of from 0.01 to 3 mL/minute per 1 cm$^2$ of the substrate to be polished.

12. A method for reducing scratches of a substrate to be polished, comprising the step of polishing the substrate to be polished with a polishing composition that has been introduced between the substrate and a polishing pad, said composition comprising an abrasive having an average particle size of from 1 to 30 nm and water, wherein the abrasive has a packing ratio adjusted to 79 to 90% by weight of the polishing composition, wherein the packing ratio is calculated according to formula (1):

$$\text{Packing ratio (\% by weight)} = (B/A) \times 100 \qquad (1)$$

wherein A is the weight of a precipitated cake composed of sediments of the abrasive particles, and B is the weight of dried solid of the precipitated cake.

13. The method according to claim 12, wherein the polishing pad is pressed with a polishing load of from 0.5 to 20 kPa.

14. The method according to claim 12, wherein the polishing pad is pressed against the substrate to be polished, while feeding the polishing composition at a rate of from 0.01 to 3 mL/minute per 1 $cm^2$ of the substrate to be polished.

* * * * *